United States Patent
Still et al.

(10) Patent No.: US 7,216,176 B1
(45) Date of Patent: *May 8, 2007

(54) SELECTIVELY FORCED REDIRECTION OF NETWORK TRAFFIC

(75) Inventors: David N. Still, Santa Ana, CA (US); John S. Calabrese, Mission Viejo, CA (US)

(73) Assignee: Cisco Technology, Inc., San Jose, CA (US)

( * ) Notice: Subject to any disclaimer, the term of this patent is extended or adjusted under 35 U.S.C. 154(b) by 434 days.

This patent is subject to a terminal disclaimer.

(21) Appl. No.: 10/791,485

(22) Filed: Mar. 1, 2004

Related U.S. Application Data

(63) Continuation of application No. 09/225,909, filed on Jan. 5, 1999, now Pat. No. 6,718,390.

(51) Int. Cl.
*G06F 15/16* (2006.01)

(52) U.S. Cl. ............................... 709/229; 719/313

(58) Field of Classification Search ........ 719/310–320, 719/328–330; 709/201–253; 713/150–181
See application file for complete search history.

(56) References Cited

U.S. PATENT DOCUMENTS

| | | | |
|---|---|---|---|
| 5,872,847 A | 2/1999 | Boyle et al. | |
| 5,872,915 A | 2/1999 | Dykes et al. | |
| 5,946,399 A | 8/1999 | Kitaj et al. | |
| 6,067,620 A | 5/2000 | Holden et al. | |
| 6,081,829 A | 6/2000 | Sidana | |
| 6,094,485 A | 7/2000 | Weinstein et al. | |
| 6,175,869 B1* | 1/2001 | Ahuja et al. | 709/226 |
| 6,286,029 B1 | 9/2001 | Delph | |
| 6,470,389 B1 | 10/2002 | Chung et al. | |

* cited by examiner

*Primary Examiner*—William Thomson
*Assistant Examiner*—Diem Cao
(74) *Attorney, Agent, or Firm*—Hickman Palermo Truong & Becker LLP

(57) ABSTRACT

A method of redirecting a client request, directed from a client to a first server, to a second server. The client request is received at the second server and automatically forwarded or redirected to the first server. The first server processes the request and generates a result message, which may include a document formatted in a markup language. The first server sends the result message to the second server. A process at the second server identifies, in the result message, references to resources of the first server. The references to resources of the first server are replaced with translated references that reference the second server, and the translated references are sent to the client as a response to the client request. As a result, subsequent client requests that are based on the response or the result message are always directed to the second server rather than to the first server. Accordingly, the second server can prevent the client from communicating directly with the first server.

34 Claims, 5 Drawing Sheets

SELECTIVELY FORCED REDIRECTION OF NETWORK TRAFFIC

CROSS-REFERENCE TO RELATED APPLICATIONS; PRIORITY CLAIM

This application claims domestic priority under 35 U.S.C. 120 as a Continuation of prior application Ser. No. 09/225,909, filed Jan. 5, 1999 now U.S. Pat. No. 6,718,390, the entire contents of which are hereby incorporated by reference as if fully set forth herein.

FIELD OF THE INVENTION

The present invention generally relates to data processing. The invention relates more specifically to selectively forcing network communications, such as HTML results generated by a Web server, to go a particular location.

BACKGROUND OF THE INVENTION

In a client/server computing environment a need may arise to enable a client to communicate with two servers, each of which provide functions that represent a portion of a service desired by the client. In some cases, it is desirable to permit the client to communicate with only a first one of the two servers and to prevent direct contact between the client and the other of the two servers.

FIG. 1 is a block diagram of a networked computer system in which the foregoing general problem may arise. Client 102 is a computer device such as a workstation, server, router, or switch. Client 102 is coupled to network 104, which is an interconnected combination of computers, terminals, or peripherals used to provide communications between two or more points. A first server 106 and a second server 108 are coupled to network 104, logically separated from client 102. In one embodiment, client 102, network 104, and servers 106, 108 communicate using TCP/IP network protocols, and using HTTP protocol messages that comprise requests and responses. Such protocols are exemplary and not required.

Client 102 may communicate an HTTP request for a service to network 104. The request includes a name or other identifier of server 106, which client 102 expects to provide the requested service. Network 104 locates server 106 and routes the request to server 106, thereby establishing a logical connection 110 from client 102 to the server. Server 106 determines that it cannot provide the function or service solicited in the request, but that server 108 can provide the function or service. Accordingly, software elements in server 106 automatically divert or "redirect" the request to server 108 over a logical connection 112, which may physically travel through the network 104. Server 108 processes the request, generates a response message, and sends the response message back to client 102 over logical connection 114, which may pass through network 104.

In this scenario, when the client and the servers use HTTP, the response message may include a document formatted using a structured markup language, such as HTML. The HTML document may contain hyperlinks or other references to resources within server 108, or other servers or network elements. As a result, client 102 may select one of the hyperlinks or references, and thereby attempt to request a service of server 108 directly along connection 114. Server 106 would not be involved in processing such a request.

This result is undesirable in several circumstances. The server 106 may have been designated as authoritative for certain kinds of transactions. The server 106 may have redirected the original request to server 108 solely because server 106 cannot directly process the request, whereas server 108 can, but server 106 may need to remain in control of the overall transaction. For example, server 106 may have redirected the original request to server 108 just to carry out a specialized or subordinate task, although server 106 remains responsible for the total transaction or for presenting a consistent interface to the client 102.

Accordingly, there is a need in this field for a mechanism that allows a client request to be redirected from a first server to a second server, while keeping the first server in control of subsequent requests by the client for services of the second server.

In particular, there is a need for a mechanism that prevents the client from directly communicating with the second server even after the first server has redirected a request of the client to the second server.

There is a specific need in Internet protocol networks, such as Intranets or the Internet in which clients and servers use TCP/IP and HTTP, to force subsequent requests resulting from HTML generated by the second server to come back to the first server for further redirection.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
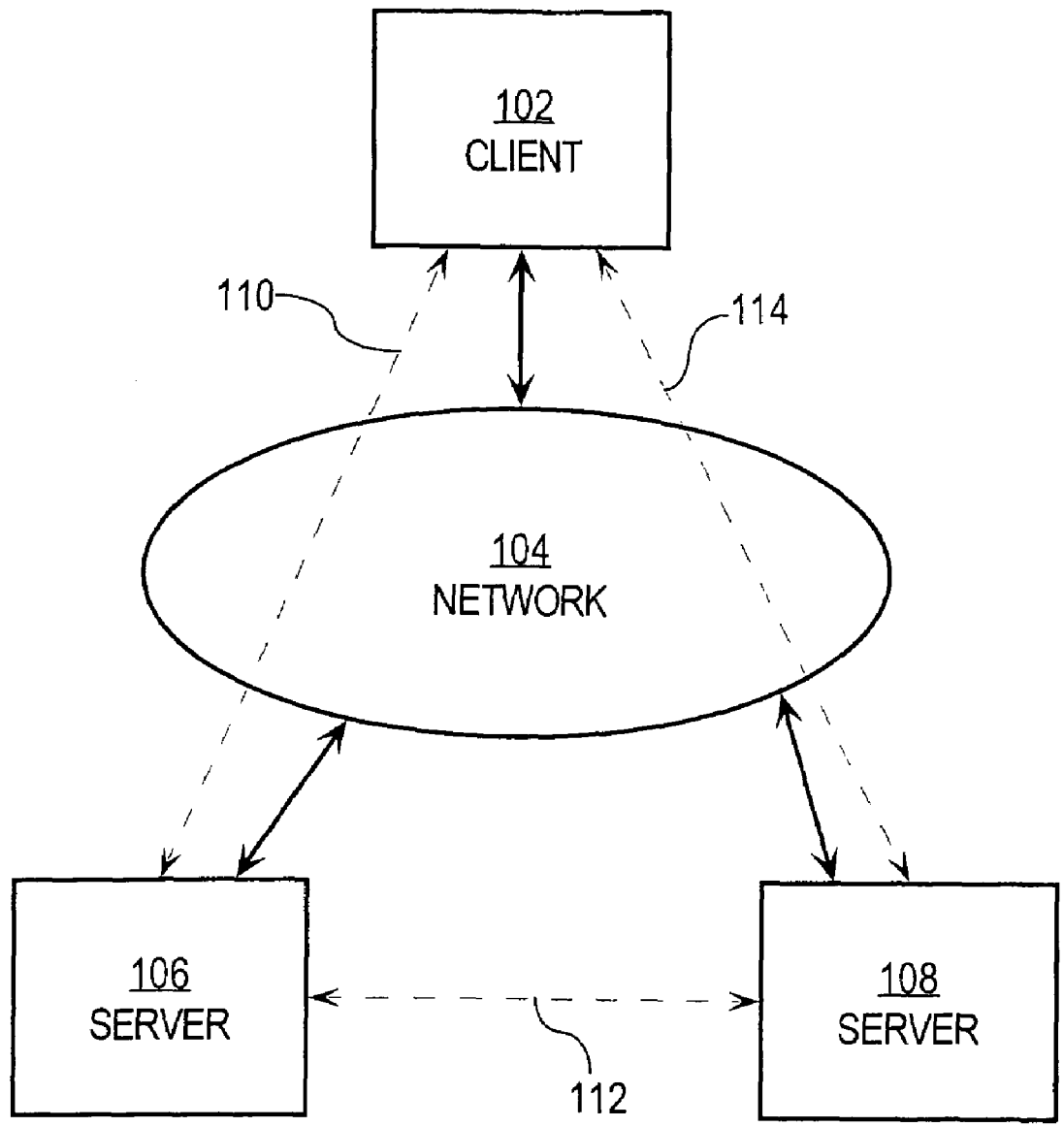
FIG. 1 is a block diagram of a networked computer system.

A method and apparatus for selectively forced redirection of network traffic is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

General Overview

The foregoing needs and objects, and other needs and objects that will become apparent from the following description, are achieved by the present invention, which comprises, in one aspect, a method of redirecting a request from a client that may be served by a first server to a second server. Generally, the method involves the computer-implemented steps of receiving a client request at the second server; automatically forwarding the client request to the first server; receiving a result message from the first server; identifying, in the result message, references to resources of the first server; replacing the references to resources of the first server with translated references that reference the second server; and sending the translated references to the client as a response to the client request.

One feature of this embodiment further involves receiving, at the second server, a second client request based on the response; and for the second client request, repeating the steps of automatically forwarding, receiving a result message, identifying, replacing, and sending. According to another feature, the identifying step involves parsing the result message to identify one or more tags that are associated with references to resources of the first server; and matching the tags to attributes that identify resources of the first server.

According to another feature, the replacing step involves attaching, to each of the references to resources of the first server, a value that identifies a process of the second server that carries out the identifying step and the replacing step. A related feature is that the replacing step comprises attaching, to each of the references to resources of the first server, a value that identifies a process of the second server that carries out the identifying step and the replacing step.

In yet another feature, the step of receiving a client request at the second server involves receiving a client HTTP request at a second Web server; the step of automatically forwarding the client request to the first server is redirecting the client HTTP request to a first Web server; and the step of receiving a result message from the first server involves receiving an HTTP response message from the first Web server that contains an HTML document. A related feature is that the step of identifying, in the result message, references to resources of the first server comprises parsing the HTML document to identify one or more URLs. Another related feature is that the step of identifying, in the result message, references to resources of the first server comprises parsing the HTML document to identify one or more relative URLs that lack an explicit reference to the first server or one or more URLs that explicitly reference the first server. Yet another related feature is that the steps of identifying and replacing are carried out using a CGI script that may contain one or more associated software elements, and the step of replacing involves attaching, to each of the references to resources of the first server, a value that identifies the CGI script.

According to another feature, the steps of identifying, replacing and sending involve stream tokenizing the result message into a plurality of tags, each of the tags having zero or more attributes; storing in an output message any tags that are not associated with references to resources of the first server; for each tag that is associated with a reference to a resource of the first server: identifying a resource attribute associated with the tag that identifies the resource; prepending a value, which identifies a software element that carries out the steps of identifying and replacing, to the resource attribute; and storing the tag, value, and resource attribute in the output message.

In yet another feature, the first server and the second server form part of a load-balanced server group, and both the first server and the second server are capable of responding to the client request.

In one embodiment, a function resides at a first Web server. The function redirects all requests to it from clients to a second Web server. The first Web server receives the result of the request from the second Web server. If the result contains an HTML document, then the first server changes all Uniform Resource Locators ("URL"s) in the HTML document that reference the second server to reference the function of the first server instead. The modified HTML document is then passed back to the client. As a result, subsequent requests based on the HTML document are forced to come to the first server. Advantageously, functions offered by two Web servers may be combined while causing the client to view the functions as being provided only by the first Web server.

Structural & Functional Overview

Figure 2:
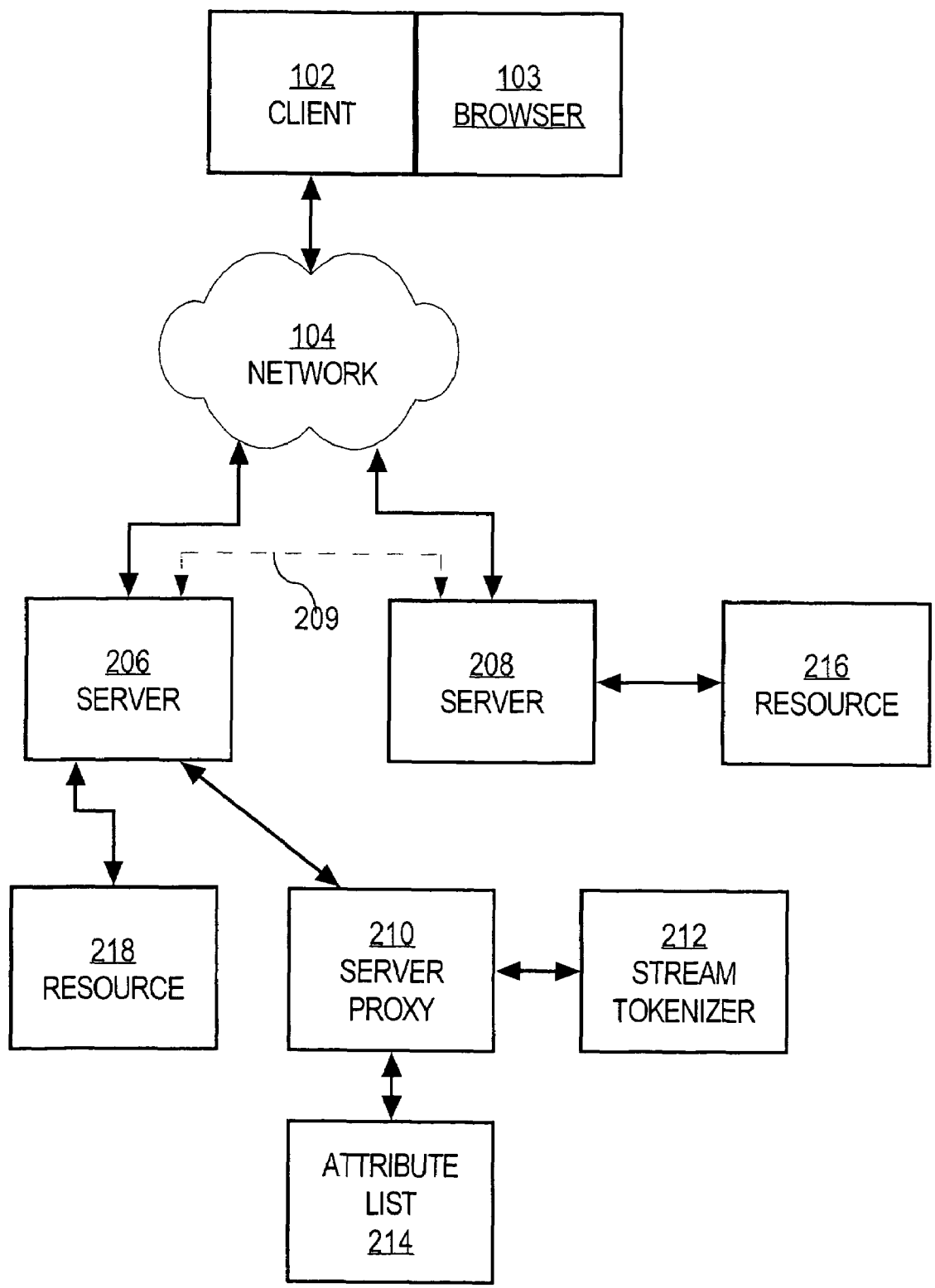
FIG. 2 is a block diagram of a networked computer system according to an embodiment.

FIG. 2 is a block diagram of a networked computer system in which a method of selectively forced redirection of network traffic may be carried out.

As in the system of FIG. 1, a client 102 communicates with a network 104. In the preferred embodiment, client 102 executes a Web browser 103 and communicates with network 104 using HTTP requests and responses. A first server 208 and a second server 206 are coupled to network 104 and provide one or more network resources that can be accessed by the browser 103 using appropriate HTTP requests. For clarity, FIG. 2 does not show all possible logical data communication paths that may be established between client 102 and servers 206, 208. Path 209 is a logical communication path that may be used when server 206 and server 208 communicate with one another.

Server 206 is coupled to a Server Proxy 210, which may be one or more software or hardware elements or processes contained within or communicating with server 206. In one embodiment, Server Proxy 210 is coupled to and interacts with a stream tokenizer 212 and an attribute list 214, however, these elements are not required.

Server 208 is coupled to or includes at least one resource 216 that is used by client 102. The resource 216 may be, for example, a Web page or a Web application, such as an interactive electronic commerce application. Similarly, server 206 is coupled to a resource 218, which may be a Web application or similar program.

In this configuration, Server Proxy 210 is configured to interact with server 206 to selectively force redirection of network traffic directed to server 208 from that server to server 206. In one embodiment, Server Proxy 210 is one or more software elements that are installed on and executed by server 206. In a preferred embodiment, Server Proxy 210 is configured with computer program instructions that cause the system of FIG. 2 to operate generally as follows.

Client 102 submits a request for resource 218 to the network 104. The request may be submitted in the form of a URL that includes the name of server 206, which hosts resource 218. The term "host" means to store or execute a resource, or manage execution of a resource located elsewhere.

Through means that are well known in this field, such as by using the DNS system, network 104 determines the location of server 206 and routes the client's request to that server. Server 206 receives and processes the request. In an embodiment, server 206 processes the request by redirecting it to server 208 over logical path 209. The redirection may be done selectively for particular types of requests or may be done for all requests received by server 206.

Server 208 then receives and processes the request. The request may require server 208 to invoke resource 216. In one embodiment, resource 216 executes and generates one or more HTML pages as a result. For example, when resource 216 is an electronic commerce application, it may generate a catalog page, or a confirmation page showing a customer order, which are formatted in HTML for interpretation and presentation by browser 103. The HTML result may contain hyperlinks or other references to other Web pages, applications or resources hosted by server 208. Server 208 sends the HTML result to server 206.

Server Proxy 210 intercepts the HTML result. Using stream tokenizer 212, Server Proxy 210 scans the HTML result to identify references to resources hosted by server 208. If any such references are found, they are modified to refer to server 206 or to Server Proxy 210 and stored as a modified result. Server 206 sends the modified result back to client 102.

Accordingly, when a user of client 102 clicks on a hyperlink or other reference of the modified result, the hyperlink will always direct browser 103 to server 206 or to Server Proxy 210. In this way, server 206 retains control over the overall transaction with browser 103 and prevents the browser or client from interacting directly with server 208. As an example, Server Proxy 210 may be used to add Secure Sockets Layer (SSL) functions to services from a non-SSL Web server.

Server Proxy

In the preferred embodiment, Server Proxy 210 is implemented in the form of a program for use with a CGI script, which may be called ServerProxy.cgi, that is stored in association with server 206.

In general, redirection is accomplished by taking the path portion of a request sent to this program and passing the request onto the server which is being proxied for. For example, if the Server Proxy 210 is invoked by browser 103 using a URL of the form— http://aladdin/CScgi/ServerProxy.cgi/foo?bar=loo

—and aladdin:9090 is the server that is being proxied, then Server Proxy 210 will translate the request into a URL of the form:

http://aladdin:9090/foo?bar=loo

Server Proxy 210 uses this URL to invoke Server 208 (aladdin:9090). After processing by Server 208, the result of the request is sent to Server Proxy 210. If the result is non-HTML, the result will be sent on to client 102 without modification. If the result is HTML, all URLs in the HTML that point to the proxied server are modified to point to the Server Proxy 210 instead. The modified result is then sent on to client 102.

For example, the HTML tag

<A HREF="http://aladdin:9090/foo?bar=loo"> would be translated to

<A HREF="http://aladdin/CScgi/ServerProxy.cgi/foo?bar=loo">

This forces any subsequent requests from the client based on the modified HTML to come back to the Server Proxy 210. Both HTTP methods PUT and GET are supported.

In one specific embodiment, Server Proxy 210 is implemented as a CGI script coupled to a computer program in the Java language, both integrated with the CiscoSecure access control server product, which is commercially available from Cisco Systems, Inc. The Server Proxy 210 functions to add SSL capability to a Web server that lacks such capability.

In this specific embodiment, the logic described above is followed unless a request to log on to a CiscoSecure server is made, for example, using a URL of the format "/CScgi/ServerProxy.cgi/Logon". Special processing is used in this case, for performance enhancement. If SSL is not being used, the resulting HTML page is modified such that subsequent communication based on its URLs will occur directly between the proxied server and the client. The purpose for this is to optimize performance by taking Server Proxy 210 out of the link when SSL is not needed. Also, a special parameter required by the Logon service, 'SSL' (which may have the value 'true' or 'false') is appended to the request made to the proxied server.

A CGI script that invokes Server Proxy 210 is created and installed on the server that acts as proxy, for example, server 206 of FIG. 2. The CGI script is created and installed according to the requirements of that Web server. In addition to the regular CGI environment variables passed by the script, an 'actualServer' variable is passed, to tell Server Proxy 210 which server it is acting as a proxy for. A sample script is set forth in Table 1.

TABLE 1

EXAMPLE SCRIPT THAT INVOKES SERVER PROXY

```
#!/bin/sh
BASE=/export/home/k2
JBASE=/export/home/k2/java
JAVA_HOME=$BASE/java
JRE_TOP=$JAVA_HOME
JRE_CLASSES=$JRE_TOP/lib/
rt.jar:$JRE_TOP/lib/i18n.jar:$JRE_TOP/lib/class
es.jar:$JRE_TOP/lib/classes.zip:$JRE_TOP/classes
CLASSPATH=/export/home/dstill/classes:$CLASSPATH:/export/home/
k2/DBServer/DBServer.zip:/export/home/k2/FastAdmin/Acme.zip:/export/
home/k2/FastAdmin/fastadmin.zip:$WEBLOGIC/
classes:$JRE_CLASSES
PATH=$PATH:$JAVA_HOME/bin
export JAVA_HOME
export JRE_TOP
export JRE_CLASSES
export CLASSPATH
export PATH
cd $BASE/ns-home/docs/CScgi
$JBASE/bin/java \
 -Dcgi.content_type=$CONTENT_TYPE \
 -Dcgi.content_length=$CONTENT_LENGTH \
 -Dcgi.request_method=$REQUEST_METHOD \
 -Dcgi.query_string=$QUERY_STRING \
 -Dcgi.server_name=$SERVER_NAME \
 -Dcgi.server_port=$SERVER_PORT \
 -Dcgi.script_name=$SCRIPT_NAME \
 -Dcgi.path_info=$PATH_INFO \
 -DactualServer="aladdin:9095" \
 cisco.ciscosecure.fastadmin.cgi.ServerProxy
```

Stream Tokenizer

Stream tokenizer 212 is a program or process that receives a text file as input, such as an HTML file, and produces a stream of tokens that represent tags and attributes within the contents of the input file. The tokens are produced according to token selection criteria that are coded into the stream tokenizer 212. An example of a suitable program that can be used for stream tokenizer 212 is the method java.io.StreamTokenizer, which is part of the Java Development Kit version 1.1.5, commercially available from Sun Microsystems, Inc. In off-the-shelf form, this Stream Tokenizer method is hard coded to treat character "\" in strings as an escape character. In HTML, however, the character "\" is not defined as an escape character and needs to be part of appropriate tokens. Accordingly, in the preferred embodiment, the method java.io.StreamTokenizer of the JDK is modified to enable such characters to appear in tokens. This may be done by commenting out the code that handles escape functions.

Method of Selectively Forcing Redirection of Network Traffic

Figure 3A:
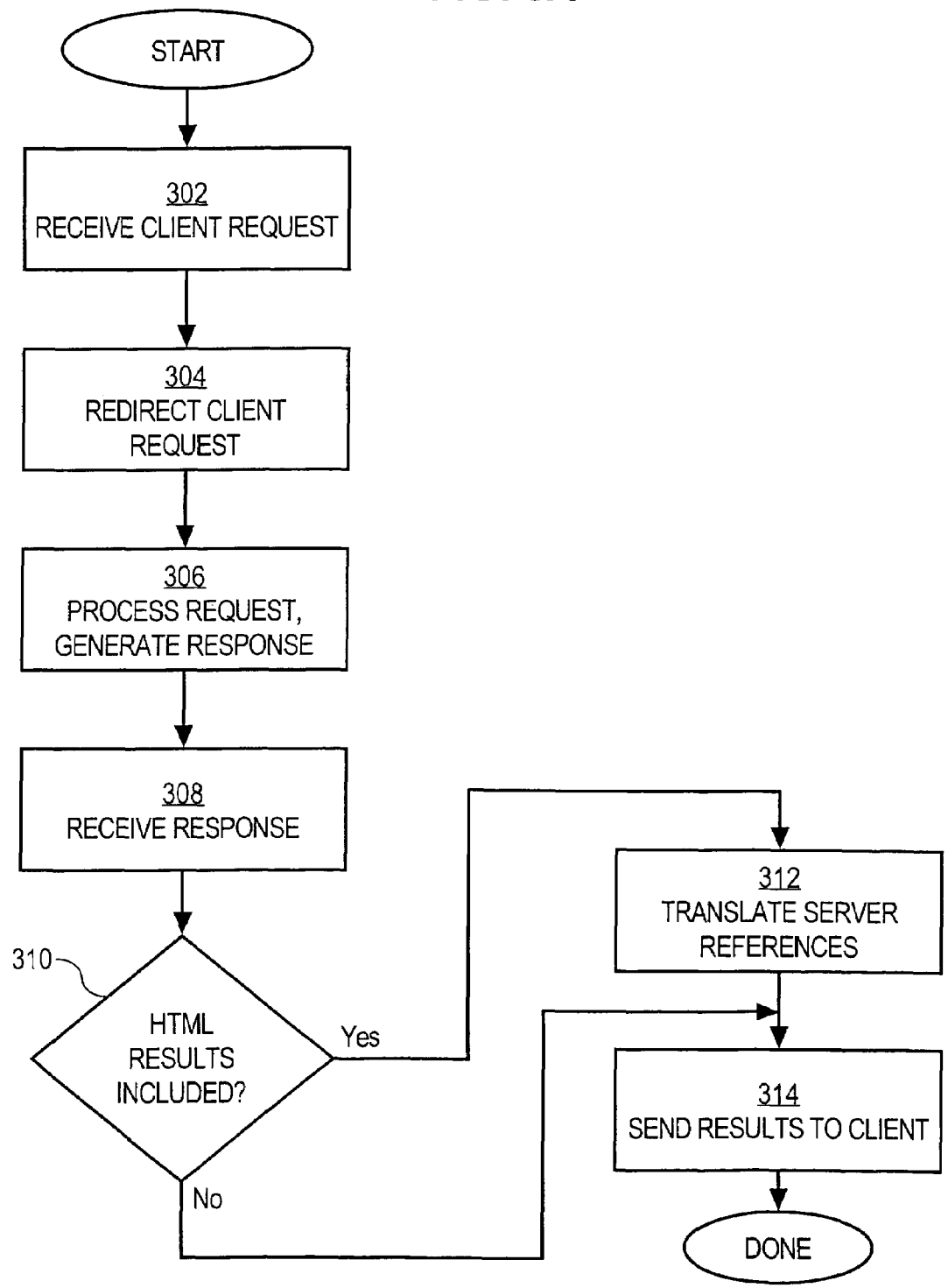
FIG. 3A is a flow diagram of a process of selectively forced redirection of network traffic.

FIG. 3A is a flow diagram of one embodiment of a method of selectively forcing redirection of network traffic. For convenience, the method of FIG. 3A is described below in connection with the structural elements of FIG. 2, however, the method of FIG. 3A does not require use of such a structure.

In block 302, a client request is received. For example, client 102 submits a request for resource 218 to the network 104 in the form of a URL that includes the name of server 206. Network 104 determines the location of server 206 and routes the client's request to that server. In block 304, the client request is automatically redirected to another server that actually processes the request and generates a response. For example, server 206 redirects the client request it to server 208 over logical path 209.

In block 306, the request is processed and a response is generated. For example, server 208 then receives and processes the request, in part by invoking resource 216, which generates one or more HTML pages as a result. The HTML result may contain hyperlinks or other references to other Web pages, applications or resources hosted by server 208. Server 208 sends the HTML result to server 206. As indicated in block 308, the response is received, for example, at Server Proxy 210.

In block 310, the process determines whether the response includes HTML results. HTML is merely an example of a format or protocol in which results may be presented. The method is equally applicable to any type of results that may internally reference a resource that is associated with the thing that generates the results.

If the response does contain HTML results, then control is passed to block 312 in which the process translates references within the HTML results. For example, when the results are generated by server 208 and reference resources associated with that server, block 312 may involve the steps of translating the references into modified references that identify server 206, Server Proxy 210, or the process of FIG. 3A itself. In one embodiment, using stream tokenizer 212, Server Proxy 210 scans the HTML result to identify references to resources hosted by server 208. If any such references are found, they are modified to refer to server 206 or to Server Proxy 210 and stored as a modified result.

In block 314, server 206 sends the modified result back to client 102.

Figure 3B:
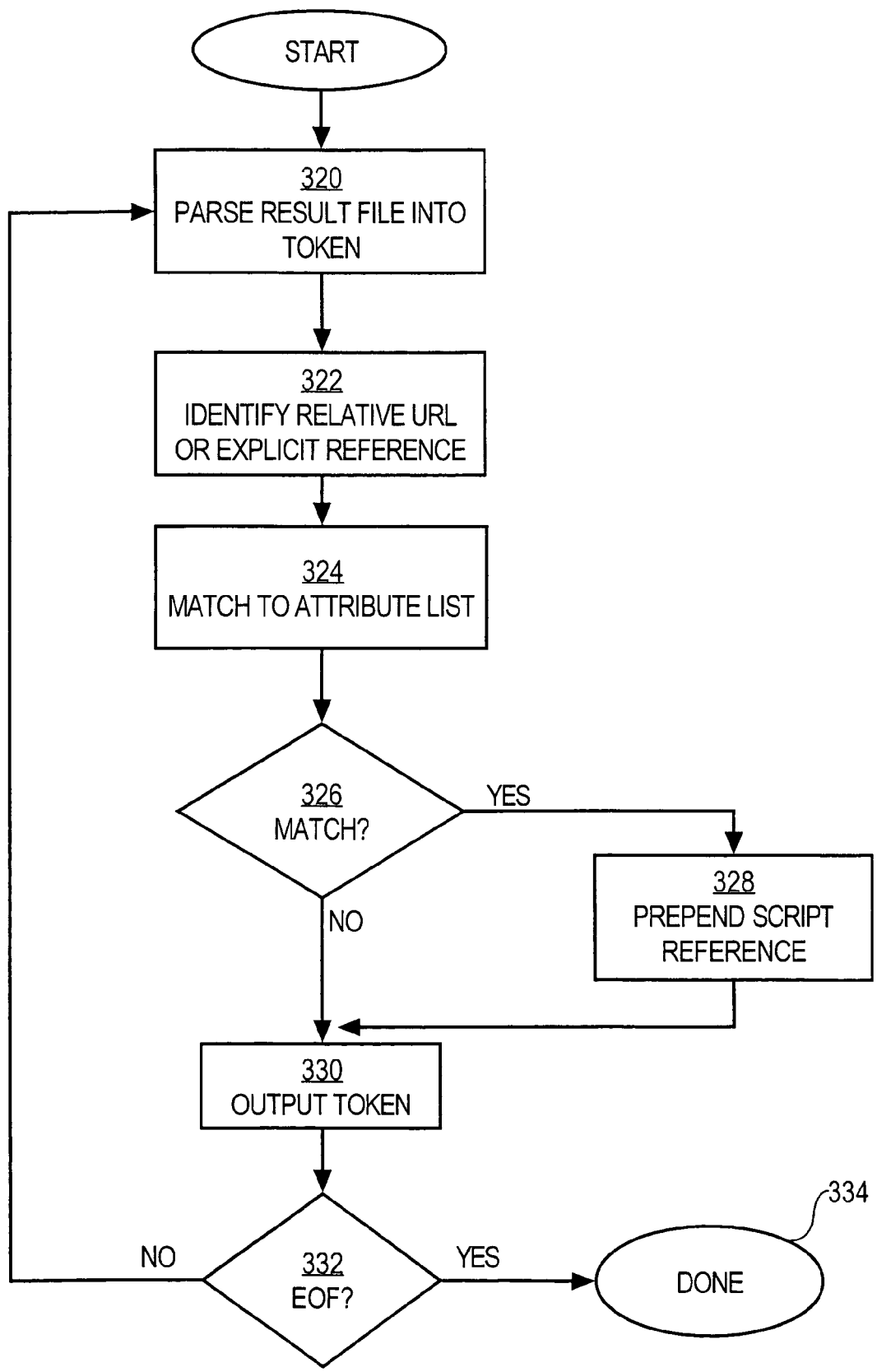
FIG. 3B is a flow diagram of further steps in the process of FIG. 3A.

FIG. 3B is a flow diagram of an embodiment of steps that may be carried out at block 312 of FIG. 3A.

In block 320, a result file that contains the results is parsed into one or more tokens. Block 320 may involve, for example, opening an input result file, opening an output result file, and using stream tokenizer 212 to scan the results to identify tokens in the input result file. As each token is identified, the steps of block 322 to block 332 are performed. Each token may comprise a tag and zero or more attributes associated with the tag.

In block 322, the process examines each token to identify each relative URL, or each explicit reference to a server. In block 324, when a token contains a relative URL or explicit server name reference, each attribute of the token is matched to a list of attributes that identify the server that created the results. The list of attributes may be a list of domain names, IP addresses, or other identifiers. Block 322 and block 324 may be carried out by Server Proxy 210 in coordination with stream tokenizer 212 and attribute list 214. For example, attribute list 214 includes: HREF; SRC; ACTION. In block 326, the process tests whether a match is found. If there is a match, then the attribute of the current token is considered a candidate for translation into a modified reference.

For example, when a token is associated with a URL that is expressed in the HTML relative URL form, meaning that it refers to a directory of the server that created the results, then that token is identified as a candidate for translation. Also, if a token contains an express reference to that server, such as a URL that literally contains the server's name, then that token is also identified as a candidate for translation.

Tokens that are not candidates for translation are written or otherwise output into the output result file, as shown in block 330.

When a token is identified as a candidate for translation, then control is passed to block 328, in which a reference to a script is prepended to the URL attribute of the token. For example, block 328 may involve prepending the name of a CGI script, which implements the process of FIG. 3A and FIG. 3B, to the URL attribute of the token. Control is then passed to block 330 in which the token is output.

Subsequently, when a user of client 102 clicks on a hyperlink or other reference of the modified result, the hyperlink will always direct browser 103 to server 206 or to Server Proxy 210. Server 206 will then redirect the browser 103 to server 208, which processes the subsequent request. If HTML is generated again, then Server Proxy 210 will translate any references to server 208 into references to server 206. In this way, server 206 retains control over the overall transaction with browser 103 and prevents the browser or client from interacting directly with server 208.

Hardware Overview

Figure 4:
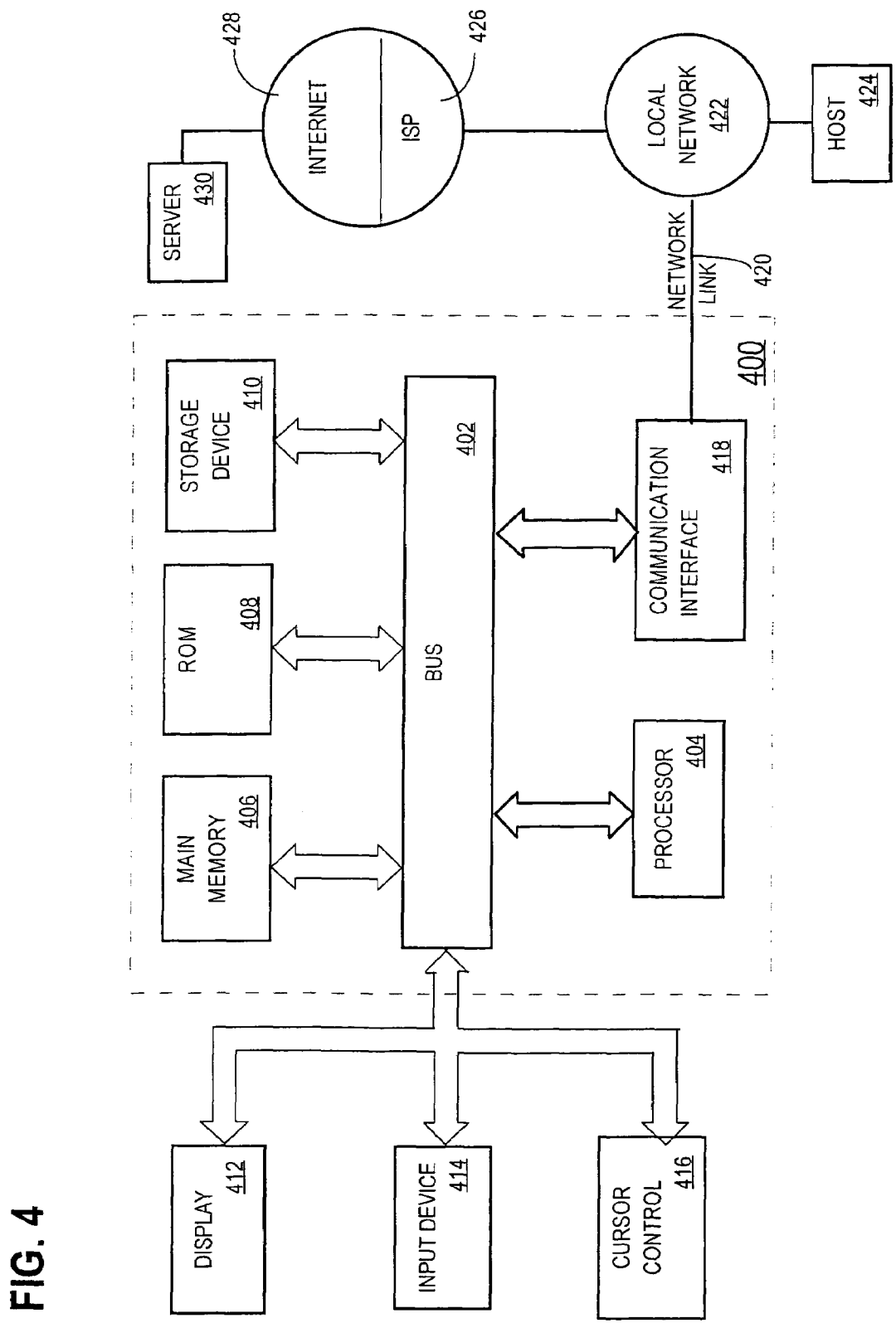
FIG. 4 is a block diagram of a computer system with which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for selectively forced redirection of network traffic. According to one embodiment of the invention, selectively forced redirection of network traffic is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for selectively forced redirection of network traffic as described herein.

The received code may be executed by processor 404 as it is received, and/or stored in storage device 410, or other non-volatile storage for later execution. In this manner, computer system 400 may obtain application code in the form of a carrier wave.

Extensions and Alternatives

In the foregoing specification, the invention has been described with reference to specific embodiments thereof. It will, however, be evident that various modifications and changes may be made thereto without departing from the broader spirit and scope of the invention. For example, the invention and claims do not require use of HTML, HTTP, or TCP/IP. These are merely convenient examples of formats and protocols that may be used. The invention encompasses and is fully applicable to, for example, results that are expressed in any hypertext format, or any other format that may contain references to the thing that created it. The specification and drawings are, accordingly, to be regarded in an illustrative rather than a restrictive sense.

What is claimed is:

1. A method of redirecting a request from a client that may be served by a first server to a second server, the method comprising the computer-implemented steps of:

receiving a client request at the second server;

the second server automatically forwarding the client request to the first server;

the second server receiving a result message from the first server;

the second server identifying, in the result message, references to resources of the first server;

the second server replacing, in the result message, all references to resources of the first server with translated references that reference the second server without replacing references to resources of any other entity other than said first server; and the second server sending the translated references to the client as a response to the client request.

2. The method recited in claim 1, further comprising the steps of:

receiving, at the second server, a second client request based on the response; and for the second client request, repeating the steps of automatically forwarding, receiving a result message, identifying, replacing, and sending.

3. The method recited in claim 1, wherein the identifying step comprises the steps of:

parsing the result message to identify one or more tags that are associated with references to resources of the first server; and matching the tags to attributes that identify resources of the first server.

4. The method recited in claim 3, wherein the replacing step comprises attaching, to each of the references to resources of the first server, a value that identifies a process of the second server that carries out the identifying step and the replacing step.

5. The method recited in claim 1, wherein the replacing step comprises attaching, to each of the references to resources of the first server, a value that identifies a process of the second server that carries out the identifying step and the replacing step.

6. The method recited in claim 1,
wherein the step of receiving a client request at the second server comprises the steps of receiving a client HTTP request at a second Web server;
wherein the step of automatically forwarding the client request to the first server comprises the steps of redirecting the client HTTP request to a first Web server;
wherein the step of receiving a result message from the first server comprises the steps of receiving an HTTP response message from the first Web server that contains an HTML document.

7. The method recited in claim 6, wherein the step of identifying, in the result message, references to resources of the first server comprises the steps of parsing the HTML document to identify one or more URLs.

8. The method recited in claim 6, wherein the step of identifying, in the result message, references to resources of the first server comprises the steps of parsing the HTML document to identify one or more relative URLs that lack an explicit reference to the first server or one or more URLs that explicitly reference the first server.

9. The method recited in claim 6, wherein the steps of identifying and replacing are carried out using a CGI script that may contain one or more associated software elements, and wherein the step of replacing comprises the steps of attaching, to each of the references to resources of the first server, a value that identifies the CGI script.

10. The method recited in claim 1, wherein the steps of identifying, replacing and sending comprise the steps of:
stream tokenizing the result message into a plurality of tags, each of the tags having zero or more attributes;
storing in an output message any tags that are not associated with references to resources of the first server;
for each tag that is associated with a reference to a resource of the first server:
identifying a resource attribute associated with the tag that identifies the resource;
prepending a value, which identifies a software element that carries out the steps of identifying and replacing, to the resource attribute; and
storing the tag, value, and resource attribute in the output message.

11. The method recited in claim 1, wherein the first server and the second server form part of a load-balanced server group, and wherein both the first server and the second server are capable of responding to the client request.

12. A data communications apparatus, comprising:
a first server that hosts a resource that may respond to the request and coupled over a network to a client;
a second server coupled to the first server;
means in the second server for receiving a request from the client at the second server, automatically forwarding the request to the first server, and receiving a result message from the first server;
means for identifying, in the result message, references to resources of the first server, and replacing, in the result message, all references to resources of the first server with translated references that reference the second server without replacing references to resources of any other entity other than said first server; and
means for sending the translated references to the client as a response to the request.

13. The apparatus recited in claim 12, wherein the second server further comprises means for receiving, at the second server, a second client request based on the response, and, for the second client request, for repeating the steps of automatically forwarding, receiving a result message, identifying, replacing, and sending.

14. The apparatus recited in claim 12, wherein the second server further comprises means for parsing the result message to identify one or more tags that are associated with references to resources of the first server, and for matching the tags to attributes that identify resources of the first server.

15. The apparatus recited in claim 14, wherein the second server further comprises means for attaching, to each of the references to resources of the first server, a value that identifies a process of the second server that carries out the identifying step and the replacing step.

16. The apparatus recited in claim 12, wherein the second server further comprises means for attaching, to each of the references to resources of the first server, a value that identifies a process of the second server that carries out the identifying step and the replacing step.

17. The apparatus recited in claim 12, wherein the second server further comprises means for receiving a client HTTP request at a second Web server, redirecting the client HTTP request to a first Web server, and receiving an HTTP response message from the first Web server that contains an HTML document.

18. The apparatus recited in claim 17, wherein the second server further comprises means for parsing the HTML document to identify one or more URLs.

19. The apparatus recited in claim 17, wherein the second server further comprises means for parsing the HTML document to identify one or more relative URLs that lack an explicit reference to the first server or one or more URLs that explicitly reference the first server.

20. The apparatus recited in claim 17, wherein the second server further comprises a CGI script that may contain one or more associated software elements, and wherein the second server further comprises means for attaching, to each of the references to resources of the first server, a value that identifies the CGI script.

21. The apparatus recited in claim 12, wherein the second server further comprises means for stream tokenizing the result message into a plurality of tags, each of the tags having zero or more attributes, for storing in an output message any tags that are not associated with references to resources of the first server, and, for each tag that is associated with a reference to a resource of the first server, for identifying a resource attribute associated with the tag that identifies the resource, prepending a value, which identifies a software element that carries out the steps of identifying and replacing, to the resource attribute, and storing the tag, value, and resource attribute in the output message.

22. The apparatus recited in claim 12, wherein the first server and the second server form part of a load-balanced server group, and wherein both the first server and the second server are capable of responding to the client request.

23. An apparatus for redirecting a request from a client that may be served by a first server to a second server, the apparatus comprising:

a first server that hosts a resource that may respond to the request and coupled over a network to a client;
a second server coupled to the first server;
a computer-readable medium in the second server comprising one or more sequences of instructions which, when executed by the second server, cause the second server to perform the steps of:
receiving a client request;
automatically forwarding the client request to the first server;
receiving a result message from the first server;
identifying, in the result message, references to resources of the first server;
replacing, in the result message, all references to resources of the first server with translated references that reference the second server without replacing references to resources of any other entity other than said first server; and
sending the translated references to the client as a response to the client request.

24. The apparatus recited in claim 23, further comprising instructions for performing the steps of:
receiving, at the second server, a second client request based on the response; and
for the second client request, repeating the steps of automatically forwarding, receiving a result message, identifying, replacing, and sending.

25. The apparatus recited in claim 23, wherein the instructions for performing the identifying step comprise instructions for performing the steps of:
parsing the result message to identify one or more tags that are associated with references to resources of the first server; and
matching the tags to attributes that identify resources of the first server.

26. The apparatus recited in claim 25, wherein the instructions for performing the replacing step comprise instructions for performing the step of attaching, to each of the references to resources of the first server, a value that identifies a process of the second server that carries out the identifying step and the replacing step.

27. The apparatus recited in claim 23, wherein the instructions for performing the replacing step comprise instructions for performing the step of attaching, to each of the references to resources of the first server, a value that identifies a process of the second server that carries out the identifying step and the replacing step.

28. The apparatus recited in claim 23,
wherein the instructions for performing the step of receiving a client request at the second server comprise instructions for performing the steps of receiving a client HTTP request at a second Web server;
wherein the instructions for performing the step of automatically forwarding the client request to the first server comprise instructions for performing the steps of redirecting the client HTTP request to a first Web server;
wherein the instructions for performing the step of receiving a result message from the first server comprise instructions for performing the steps of receiving an HTTP response message from the first Web server that contains an HTML document.

29. The apparatus recited in claim 28, wherein the instructions for performing the step of identifying, in the result message, references to resources of the first server comprises instructions for performing the steps of parsing the HTML document to identify one or more URLs.

30. The apparatus recited in claim 28, wherein the instructions for performing the step of identifying, in the result message, references to resources of the first server comprise instructions for performing the steps of parsing the HTML document to identify one or more relative URLs that lack an explicit reference to the first server or one or more URLs that explicitly reference the first server.

31. The apparatus recited in claim 28, wherein the instructions for performing the steps of identifying and replacing are carried out using a CGI script that may contain one or more associated software elements, and wherein the instructions for performing the step of replacing comprise instructions for performing the steps of attaching, to each of the references to resources of the first server, a value that identifies the CGI script.

32. The apparatus recited in claim 23, wherein the instructions for performing the steps of identifying, replacing and sending comprise instructions for performing the steps of:
stream tokenizing the result message into a plurality of tags, each of the tags having zero or more attributes;
storing in an output message any tags that are not associated with references to resources of the first server;
for each tag that is associated with a reference to a resource of the first server:
identifying a resource attribute associated with the tag that identifies the resource;
prepending a value, which identifies a software element that carries out the steps of identifying and replacing, to the resource attribute; and
storing the tag, value, and resource attribute in the output message.

33. The apparatus recited in claim 22, wherein the first server and the second server form part of a load-balanced server group, and wherein both the first server and the second server are capable of responding to the client request.

34. A computer-readable storage medium carrying one or more sequences of instructions for redirecting a client request of a client that may be serviced by a first server, to a second server, wherein execution of the one or more sequences of instructions by one or more processors causes the one or more processors to perform the steps recited in any of claims 1, 2, 3, 4, 5, 6, 7, 8, 9, 10, or 11.

* * * * *